United States Patent [19]
Ladd

[11] 3,991,120
[45] Nov. 9, 1976

[54] HYDROXYETHOXYPHENYL CHLOROETHYLENE COMPOUND

[75] Inventor: John R. Ladd, Ballston Lake, N.Y.

[73] Assignee: General Electric Company, Schenectady, N.Y.

[22] Filed: Feb. 17, 1976

[21] Appl. No.: 658,500

[52] U.S. Cl. .......................... 260/613 R; 424/341; 260/463; 260/485 G; 260/77.5 D; 260/78.41
[51] Int. Cl.² ........................................ C07C 43/28
[58] Field of Search ............................... 260/613 R

[56] References Cited
UNITED STATES PATENTS

| | | | |
|---|---|---|---|
| 2,464,600 | 3/1949 | Meitzner et al. | 260/613 R X |
| 2,484,057 | 10/1949 | Shirley | 260/613 R |
| 2,883,428 | 4/1959 | Nemec et al. | 260/613 R |
| 3,247,265 | 4/1966 | Speziale et al. | 260/613 R X |

*Primary Examiner*—Bernard Helfin
*Attorney, Agent, or Firm*—Joseph T. Cohen; Jerome C. Squillaro

[57] ABSTRACT

The compound 2,2-bis(4-hydroxyethoxyphenyl)-1,1-dichloroethylene is described as well as its use as an insecticide.

1 Claim, No Drawings

HYDROXYETHOXYPHENYL CHLOROETHYLENE COMPOUND

This invention is concerned with a novel hydroxyethoxyphenyl chloroethylene compound corresponding to the formula

I

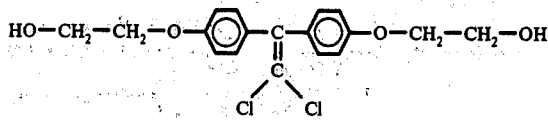

which can also be designated as 2,2-bis(4-hydroxyethoxyphenyl)-1,1-dichloroethylene.

The above-identified compound, which for brevity will hereinafter be referred to as "chloroethylene compound," has many uses. It has been found to have insecticidal properties and has been tested in connection with its insecticidal effect on mosquitoes. In addition, the chloroethylene compound can be interacted with either phosgene or aliphatic and aromatic dicarboxylic acids to form in the first case, polymers corresponding to the general formula

II

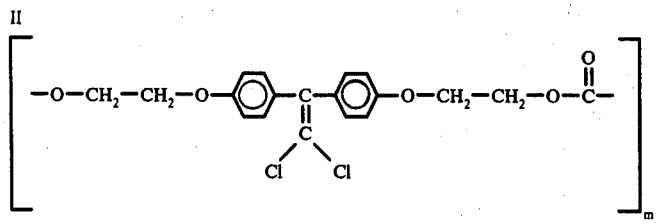

and in the second case, polymers of the general formula

III

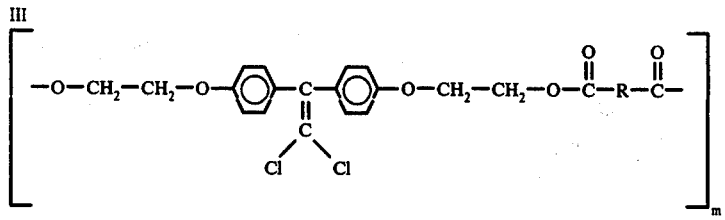

where R is a divalent aliphatic or aromatic compound, for instance ethylene, propylene, butylene, the isomeric phenylene radicals derived from acids such as isophthalic acid and terephthalic acid, etc., and m is a whole number greater than 1, e.g., from 10 to 1000 or more. These polymers have many uses in the molding and insulating arts and can be used for making heat-resistant automobile products or as heat-resistant insulation for electrical conductors.

In preparing the dichloroethylene compound, the precursor compound 2,2-bis(4-hydroxyphenyl)-1,1,1-crichloroethane is prepared by first reacting phenol and chloral in a manner well known in the art, and then dehydrohalogenating the formed compound to give the dichloroethylene of the formula IV 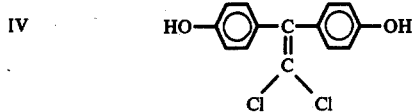

Thereafter, the dihydroxy compound of formula IV is reacted with ethylene oxide under pressure in the presence of a solvent such as methanol and in the presence of aqueous sodium hydroxide at elevated temperatures for a time sufficient to give the desired dichloroethylene compound of formula I.

In order that those skilled in the art may better understand how the present invention may be practiced, the following examples are given by way of illustration and, not by way of limitation.

EXAMPLE 1

A 4 liter stainless steel pressure reactor was charged with 170 grams of 2,2-bis(4-hydroxyphenyl)-1,1-dichloroethylene (formula IV), 2 liters methanol and 2 grams of 50% aqueous sodium hydroxide. The reaction vessel was closed and the reaction mixture heated to 75° C. and the pressure vented. Eighty grams of ethylene oxide was introduced into the pressure reactor producing a pressure between 15 to 20 psi. The reaction was allowed to continue at the aforesaid temperature for about 18 hours until there was no more uptake of ethylene oxide as indicated by no more decrease in pressure. The reactor was vented and opened, a small amount of acetic acid was added to neutralize the sodium hydroxide and the solution was filtered hot. The filtrate was allowed to crystallize and the crystalline material was recrystallized from toluene to give 200 grams of the dichloroethylene compound of formula I, having a melting point of 141°–144° C. in a yield of about 90% of the theoretical. The identity of compound was established by gas chromatography as well as by carbon, hydrogen, and chlorine analyses which were as follows:

|      | Found | Calculated |
|------|-------|------------|
| % C  | 58.7  | 58.4       |
| % H  | 5.1   | 4.9        |
| % Cl | 19.2  | 19.2       |

The insecticidal properties of the dichloroethylene compound was established as follows. An open dish containing the dichloroethylene compound was exposed to the air with a thin paper covering over the face of the dish. After several days, in an environment which was frequented by mosquitoes, the surface of the material in the dish was observed to contain a number of dead mosquitoes, indicating that the material had not only attracted the mosquitoes, since they had to find their way into the dish which was fairly well covered, but had also caused their death.

In addition to the uses described above for the dichloroethylene compound, it can also be employed for copolymerization purposes in other esterification polymerization reactions to introduce into the first polymer molecule recurring units derived from the dichloroethylene compound which can impart flame-retardancy to the polymer. One example of this would be the interpolymerization of approximately equal molar concentrations of the dichloroethylene compound with butylene glycol (bisphenol-A can also be used) and dimethyl terephthalate, the latter dimethyl terephthalate being employed in a molar quantity required to esterify the hydroxy groups of both the dichloroethylene compound and the butylene glycol. Such polymers will be found to be increasingly flame-retardant over the same butylene glycol terephthalate from which the dichloroethylene compound was omitted for copolymerization purposes. Polycarbonate resins from the dichloroethylene compound alone or interacted with bisphenol-A are not precluded.

I claim:
1. A compound corresponding to the formula

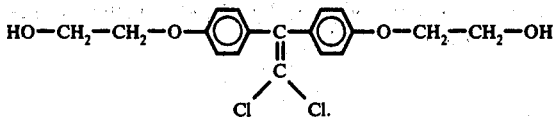

* * * * *